United States Patent [19]

Miyata et al.

[11] Patent Number: 4,505,887

[45] Date of Patent: Mar. 19, 1985

[54] FIBROUS MAGNESIUM OXIDE AND PROCESS FOR PRODUCTION THEREOF

[75] Inventors: Shigeo Miyata; Akira Okada, both of Takamatsu; Toru Hirose, Kagawa, all of Japan

[73] Assignee: Kyowa Chemical Industry Co., Ltd., Tokyo, Japan

[21] Appl. No.: 625,296

[22] Filed: Jun. 27, 1984

[30] Foreign Application Priority Data

Jun. 27, 1983 [JP] Japan ................................ 58-114365

[51] Int. Cl.$^3$ .............................................. C01F 5/14
[52] U.S. Cl. ..................................... 423/635; 423/636; 423/637; 423/638; 423/639
[58] Field of Search ............... 423/635, 636, 637, 638, 423/639

[56] References Cited

U.S. PATENT DOCUMENTS 4,145,404 3/1979 Miyata et al. ...................... 423/639
4,246,254 1/1981 Miyata et al. ...................... 423/636

*Primary Examiner*—John Doll
*Assistant Examiner*—Wayne A. Langel
*Attorney, Agent, or Firm*—Sherman & Shalloway

[57] ABSTRACT

A magnesium oxide having a cubic system needle-like crystal structure and a length-to-diameter ratio, determined by an electron microscope at a magnification of 10,000, of at least about 5; and a process for producing a magnesium oxide having a cubic system needle-like crystal structure, which comprises calcining a basic magnesium compound having a needle-like crystal structure expressed by the following formula $$Mg(OH)_{2-nx}A_x^{n-}\cdot mH_2O$$

wherein $A^{n-}$ represents a monovalent (n=1) to tetravalent (n=4) anion, x is $0.2 \leq x \leq 0.5$, and m is $0 < m \leq 2$, or a magnesium hydroxide having a needle-like crystal structure, at a temperature of not less than about 400° C. to convert it to the magnesium oxide.

4 Claims, 5 Drawing Figures

(×150)

(× 150)

(× 150)

(× 10,000)

(× 10,000)

Figure 2:
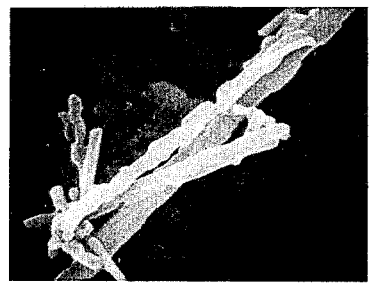
Figure 2:
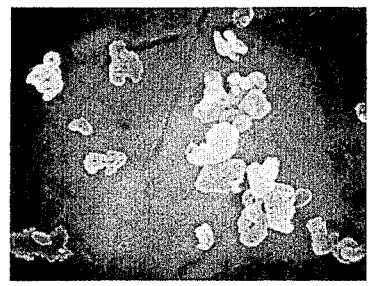

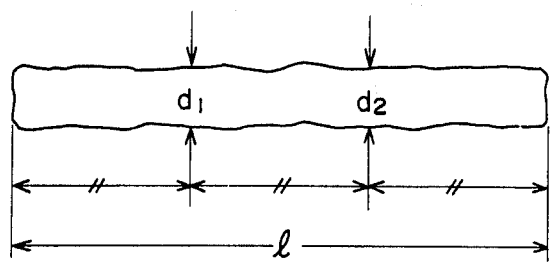
Fig. 2-C

FIBROUS MAGNESIUM OXIDE AND PROCESS FOR PRODUCTION THEREOF

This invention relates to a magnesium oxide having a hitherto-unknown crystal shape, and to a process for producing said magnesium oxide. The novel magnesium oxide has utility in new fields as well as conventional uses of magnesium oxide because of its useful characteristics such as its unique and hitherto-unknown fibrous shape and excellent chemical and physical properties.

More specifically, this invention relates to a magnesium oxide having a cubic system needle-like crystal structure and a length-to-diameter ratio, determined by an electron microscope at a magnification of 10,000, of at least 5. Preferably, the magnesium oxide has an average diameter of about 0.01 to about 10 microns and a length of about 0.1 to about 10,000 microns.

The fibrous magnesium oxide in accordance with this invention can be produced, for example by the following process to which the invention also pertains.

A process for producing a magnesium oxide having a cubic system needle-like crystal structure, which comprises calcining a baseic magnesium compound having a needle-like crystal structure expressed by the following formula

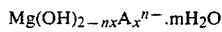

$$Mg(OH)_{2-nx}A_x{}^{n-}\cdot mH_2O$$

wherein $A^{n-}$ represents a monovalent (n=1) to tetravalent (n=4) anion, x is $0.2 \leq x \leq 0.5$ and m is $0 < m \leq 2$,
or a magnesium hydroxide having a needle-like crystal structure, at a temperature of not less than about 400° C., preferably not less than about 900° C., to convert it to the magnesium oxide.

It is well known that magnesium oxide has a cubic system plate-like or cubic crystal form having a rock salt-type structure. The conventional magnesium oxide, when viewed under an optical or electron microscope, looks like particles in the form of cubes or nearly spherical particles attributed to the fact that it is of a cubic system having a rock salt-type structure, or an assembly or fragments of such particles. The ratio of the maximum length (maximum diameter)/minimum length (minimum diameter) of the conventional magnesium oxide determined under an electron microscope at a magnification of 10,000 is less than about 1.5 at the largest, and is usually about 1 to 1.2.

Magnesium oxide is an inorganic compound having very good heat resistance, insulating property, thermal conductivity and alkali resistance, and exhibits such a chemical utility as to effectively neutralize a minute amount of an acidic substance and inactivating it. However, because of its cubic or spherical shape mentioned above attributed to the fact that it is a cubic system crystal of the rock-salt structure, it is virtually impossible to make it function as a reinforcing agent by filling it in a resin. Furthermore, when it is utilized in a molded article such as a refractory brick, the mechanical strength of the molded article is unsatisfactory.

Some of the coinventors of the present application previously discovered that fibrous magnesium hydroxide having a hitherto-unknown hexagonal needle-like crystal structure can exist and can be produced easily from a basic magnesium compound in the form of needle-like crystals, and disclosed this fact in Japanese Laid-Open Patent Publication No. 112400/1979 (corresponding to U.S. Pat. No. 4,246,254 and British Pat. No. 2,017,066).

On further investigation, the present inventors have now discovered the new fact that fibrous magnesium oxide having a hitherto-unknown cubic system needle-like crystal structure can exist stably, and can be easily produced.

Investigations of the present inventors have led to the discovery that by clacining a basic magnesium compound having a known monoclinic or rhombic system needle-like crystal structure or the aforesaid magnesium hydroxide having a hexagonal needle-like crystal form at a temperature of at least about 400° C., it can be converted to the fibrous magnesium oxide of this invention having the hitherto-unknown cubic system needle-like crystal structure.

It has also been found that the fibrous magnesium oxide of this invention is a unique material having excellent heat resistance, insulating property, thermal conductivity, alkaline resistance, stability and reinforcing characteristics, and that when it is filled in a resin, the thermal conductivity of the resin can be markedly improved over the case of using the known magnesium oxide and can achieve a marked improvement in various other properties such as tensile strength, flexural strength, modulus of elasticity, impact strength, and heat distortion temperature.

Furthermore, it has been found that when the magnesium oxide is molded and calicined into a refractory brick, the refractory brick is porous and very light in weight and has excellent thermal insulation and high mechanical strength, and can achieve outstanding savings of energy because of its excellent heat insulating properties.

These advantages are excellent and quite unexpected from the known magnesium oxides.

When it is desired to produce whiskers of magnesium oxide (single crystals of MgO) by a generally known technique, it would be necessary to rely on a difficult and commercially infeasible technique of heating magnesium oxide to a temperature above its melting point (about 2800° C.) to form a melt, partly gasifying it, and cooling the gasified product on a suitable substrate for inducing crystal growth (although the inventors do not at all know any such attempt). It has been found in accordance with this invention that the fibrous magnesium oxide of this invention having the hitherto-unknown cubic system needle-like crystal structure can be produced in quantities by an industrially easy operation at lower temperatures and can be obtained as single crystals of a fibrous shape close to whiskers or as an assembly of such fibrous single crystals.

It is an object of this invention to provide magnesium oxide having a hitherto-unknown fibrous shape.

Another object of this invention is to provide an advantageous process for producing the aforesaid fibrous magnesium oxide.

The above and other objects and advantages of this invention will become apparent from the following description.

Figure 1A:
Figure 1B:
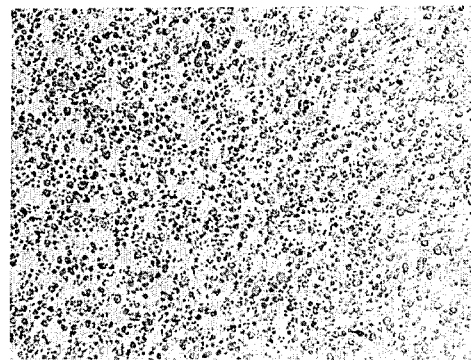

For a better understanding of the present invention, a conventional magnesium oxide having a cubic system cubic crystal structure and the fibrous magnesium oxide having a cubic system needle-like crystal structure of this invention are described below with reference to the accompanying drawings in which:

FIG. 1-A is a photograph of one example of the fibrous magnesium oxide of the invention taken through an optical microscope at a magnification of 150;

FIG. 1-B is a photograph, similar to FIG. 1-A, of a known magnesium oxide having a cubic system cubic crystal structure;

FIG. 2-A is a photograph of one example of the fibrous magnesium oxide of the invention taken through an electron microscope at a magnification of 10,000; and FIG. 2-B is a photograph, similar to FIG. 2-A, of one example of the known magnesium oxide having a cubic system cubic crystal structure.

FIG. 2-C is a model diagram of the fibrous magnesium oxide of the invention.

It will be easily understood by comparing the FIG. A with the FIG. B that the magnesium oxide of this invention can be clearly distinguished from the known magnesium oxide having a cubic system cubic crystal structure because at first sight the former has quite a different fibrous form of needle-like form.

It is also seen from FIG. 2-A that the fibrous magnesium oxide of this invention exists as a fibrous single crystal or a fibrous assembly such single crystals.

The magnesium oxide of this invention, as shown in FIG. 2-A, has a length-to-diameter ratio (aspect ratio), determined under an electron microscope at a magnification of 10,000, of at least about 5, in many cases about 5 to about 50 or larger, and under an optical microscope, its fibrous form can be clearly observed. The fibrous magnesium oxide of this invention usually has an average diameter of about 0.01 to about 10 microns, and a length of about 0.1 to about 10000 microns. Furthermore, the fibrous magnesium oxide of this invention usually has a very high purity.

In the present invention, the length-to-diameter ratio, or the aspect ratio, determined under an electron microscope at a magnification of 10,000 is measured as follows: In the photograph shown in FIG. 2-A, one fibrous needle-like crystal is nearly equally divided into three portions along its longitudinal direction. The lengths (diameters) of the crystal which cross the crystal perpendicularly to the longitudinal direction through the two trisecting points are measured. The two measured values are arithmetically averaged, and the length of the crystal is divided by the resulting arithmetic mean, and the quotient is defined as the aforesaid aspect ratio. For example, with reference to the model diagram shown in FIG. 2-C, the aspect ratio is given by the following equation.

$$l / \frac{d_1 + d_2}{2}$$

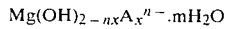

The fibrous magnesium oxide of this invention can be obtained by calcining at a temperature of at least about 400° C. a basic magnesium compound in the form of needle-like crystals represented by the following formula (1)

$$Mg(OH)_{2-nx}A_x^{n-} \cdot mH_2O \tag{1}$$

wherein $A^{n-}$ represents a mono- to tetra-valent (n=1–4) anion, x is $0.2 \leq x \leq 0.5$, and m is $0 < m \leq 2$, or magnesium hydroxide in the form of needle-like crystals which can be obtained as disclosed in the above-cited Japanese Laid-Open Patent Publication No. 112400/1979 (corresponding to U.S. Pat. No. 4,246,254 and British Pat. No. 2,017,066).

Specific examples of the anion $A^{n-}$ which the basic magnesium compound of formula (1) has include halogen ions such as $Cl^-$, $Br^-$, $I^-$ and $F^-$, $SO_4^{2-}$, $CO_3^{2-}$, $CrO_4^{2-}$, $SiO_3^{2-}$, $SO_3^{2-}$, $HPO_4^{2-}$, $HBO_3^{2-}$, $CH_3COO^-$, $(COO)_2^{2-}$, a tartrate ion, a citrate ion, a benzoate ion, a salicylate ion, $PO_4^{3-}$, $BO_3^{3-}$, $Fe(CN)_6^{3-}$, and $Fe(CN)_6^{4-}$. Preferred anions $A^{n-}$ are $Cl^-$, $Br^-$, $SO_4^{2-}$, $CO_3^{2-}$ and $HPO_4^{2-}$.

Examples of the basic magnesium compounds of formula (1) used in the production of the fibrous magnesium oxide of this invention are as follows:

$Mg_2(OH)_3Cl \cdot 3H_2O$, $Mg(OH)_{1.5}Cl_{0.5} \cdot 1.5H_2O$,
$Mg_{10}(OH)_{18}Cl_2 \cdot 5H_2O$, $Mg(OH)_{1.8}Cl_{0.2} \cdot 0.5H_2O$,
$Mg_2(OH)_3Cl \cdot 4H_2O$, $Mg(OH)_{1.5}Cl_{0.5} \cdot 2H_2O$,
$Mg_2(OH)_3Br \cdot 4H_2O$, $Mg(OH)_{1.5}Br_{0.5} \cdot 2H_2O$,
$Mg_6(OH)_{10}SO_4 \cdot 3H_2O$, $Mg(OH)_{5/3}(SO_4)_{1/6} \cdot 0.5H_2O$,
$Mg_3(OH)_5Cl \cdot 3H_2O$, $Mg(OH)_{5/3}Cl_{\frac{1}{3}} \cdot H_2O$,
$Mg_2(OH)_3Cl \cdot 2H_2O$, $Mg(OH)_{3/2}Cl_{\frac{1}{2}} \cdot H_2O$,
$Mg_3(OH)_5Cl \cdot 4H_2O$, $Mg(OH)_{5/3}Cl_{\frac{1}{3}} \cdot 4/3H_2O$,
$Mg_6(OH)_{10}HPO_4 \cdot 3H_2O$, $Mg(OH)_{5/3}(HPO_4)_{1/6} \cdot 0.5H_2O$,
$Mg_2(OH)Cl \cdot CO_3 \cdot 3H_2O$, $Mg(OH)_{0.5}Cl_{0.5}(CO_3)_{0.5} \cdot 3/2H_2O$, $Mg_3(OH)_5C_7H_5O_3 \cdot mH_2O$ and
$Mg(OH)_{5/3}(C_7H_5O_3)_{\frac{1}{3}} \cdot m'H_2O$.

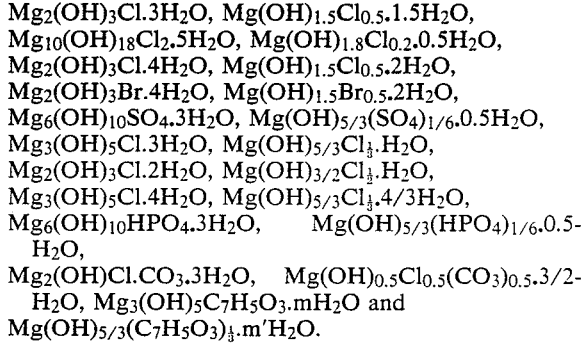

The method of producing the basic magnesium compound of formula (1) and the method of producing the magnesium hydroxide in the form of needle-like crystals which can be utilized in this invention are disclosed in detail in the above-cited Japanese Laid-Open Patent Publication No. 112400/1079 (corresponding to U.S. Pat. No. 4,246,254 and British Pat. No. 2,017,066), and can be utilized in the production of the starting compounds used in the process of this invention. For example, the basic magnesium compound in the form of needle-like crystals can be produced by reacting an aqueous solution of a water-soluble magnesium salt with less than about 0.5 equivalent, per equivalent of magnesium, of an alkali, or by hydrothermally treating the product of this invention at a temperature of about 100° C. to about 300° C. Since the anion $A^{n-}$ of the compound of formula (1) is anion-exchangeable, it can be exchanged with another anion. The magnesium hydroxide in the form of needle-like crystals can be produced, for example, by drying the basic magnesium compound in the form of needle-like crystals so as to liberate part of the water of crystallization of the compound under conditions which do not cause a loss of its needle-like crystal form, and contacting the dried product with an alkali in a liquid medium which is inert to the above compound and does not dissolve the above compound.

Another method for producing magnesium hydroxide in the form of needle-like crystals is disclosed in Japanese Patent Publication No. 32040/1982 (U.S. Pat. No. 1,140,462), and can be utilized in the production of the starting compound used in the process of this invention. According to this invention, fibrous magnesium hydroxide in the form of needle-like crystals can be produced by contacting the above-exemplified basic magnesium compound in the form of needle-like crystals with an alkali in an amount of more than about one equivalent per equivalent of the anion $A^{n-}$ in formula (1) at a temperature of at least about 60° C., or with an alkali in an amount of at least about 1.5 equivalents per equivalent of the anion $A^{n-}$ at room temperature or a higher temperature, in a liquid medium being inert to the above compound and incapable of dissolving the above compound, without subjecting the basic magnesium compound to a drying treatment involving liberation of a part or the whole of the water of crystallization from the above compound.

The fibrous magnesium oxide in the form of needle-like crystals in accordance with this invention can be produced, for example, by calcining the known basic magnesium compound in the form of needle-like crystals or the known magnesium hydroxide in the form of needle-like crystals which can be obtained as above, at a temperature of at least about 400° C. to convert it to magnesium oxide.

Preferably, the starting basic magnesium compound or magnesium hydroxide should have a well grown needle-like crystal form. The calcination can be carried out at a temperature of at least about 400° C. To obtain fibrous magnesium oxide of a high purity having lesser amounts of anion $A^{n-}$ and water, or fibrous magnesium oxide in the form of single crystals or crystals closer to single crystals, higher temperature, for example at least about 900° C., particularly at least about 1000° C., are preferably employed. For example, temperatures of about 900° to about 2000° C., especially about 1000° to about 1500° C., may preferably be employed. The calcination time is changed properly depending upon the calcination temperature, and may, for example, be about 0.1 to about 10 hours. The calcination is carried out at a temperature below about 2800° C., which is the melting temperature of magnesium oxide. When the calcination temperature reaches the melting temperature or a higher temperature, melt adhesion of the fibrous magnesium oxide occurs to cause a loss of its desired fibrous shape.

The calcination may be carried out by using a powder of the basic magnesium compound in the form of needle-like crystals or magnesium hydroxide in the form of needle-like crystals. Or the starting compound may be in the form of a molded article having a size on the order of several millimeters to several centimeters. But when the calcination temperature is higher than about 1000° C., the molded article tends to be sintered to a mass of fibrous crystals partly or wholly bonded to each other. Accordingly, when such a high calcination temperature is employed, the calcination is preferably carried out on the powder of such a starting compound.

There is no particular restriction in the atmosphere in which the calcination is carried out. It may be carried out in the atmospheric air, or in an atmosphere of an inert gas such as nitrogen gas, helium gas or argon gas, or in an atmosphere of molecular oxygen. The calcination may be carried out under elevated or reduced pressure.

The fibrous magnesium oxide of this invention obtained as above is useful in all the fields in which the conventional magnesium oxide of a cubic system cubic crystal structure has been used. In addition, by taking advantage of its excellent heat resistance, insulation, thermal conductivity, alkali resistance, stability and reinforcing properties and its high purity and fibrous shape, the magnesium oxide of this invention has an excellent utilitarian value in still wider fields of application. For example, it is useful as a raw material for refractory bricks; an agent for improving the thermal conductivity of resins; a reinforcing agent for resins; an insulating material in a sheath heater, etc.; an adsorbent for acid substances and anions; an antacid, a filtration aid; an immobilizing agent for enzymes; a heat stabilizer for halogen-containing thermoplastic resins, for example polyvinyl chloride and chlorinated polyvinyl chloride; an acid acceptor for halogen-containing rubbers such as chlorinated polyethylene, chlorinated butyl rubber, chloroprene, epichlorohydrin rubber, chlorinated butyl rubber, chloroprene, epichlorohydrin rubber, chlorosulfonated polyethylene rubber, fluorine rubber and silicone rubber; a thermal insulating material; a sound absorbing material; a material for keeping warmth or coldness; an anticorrosive material; a roofing material; a concrete filler; a non-combustible material; a fire retardant for resins; a raw material for glass fibers; a heat insulating or heat resistant cloth or sheet material; an additive to heavy oils; an agent for use in refining sugar; a carrier for Ziegler catalysts used in polymerizing olefins; a thickener and a reinforcing agent for unsaturated polyesters; an annealing and separating agent for silicon steel steels; a purifying agent for waste water and potable water; and an agent for preventing constipation.

The following examples illustrate the magnesium fibrous magnesium oxide of this invention and its production.

EXAMPLE 1

One kilograms of magnesium oxide powder was added to 4 liters of an aqueous solution of magnesium sulfate (2 moles/liter), and with stirring, the mixture was heated to 80° C. The mixture was continuously stirred under heat for more than 1 hour while adding 6 to 8 liters of water or a dilute aqueous solution of magnesium sulfate. The resulting product was suspended in 30 liters of an aqueous solution of magnesium sulfate (1 mole/liter), and the suspension was stirred at 170° C. for 4 hours in a pressurized vessel.

After the reaction, the product was separated by filtration, and washed with water to obtain fibrous magnesium hydroxysulfate, $Mg(OH)_{5/3}(SO_4)_{1/6} \cdot \frac{1}{3} H_2O$. When observed under a scanning electron microscope at a magnification of 1000, the crystals of the product were needle-like crystals having an average diameter of about 0.2 micron and a length of about 8 microns. The magnesium sulfate in the form of needle-like crystals was pulverized, and calcined in atmospheric air at about 1100° C. for 1 hour.

When observed under a scanning electron microscope at a magnification of 10,000, the calcination product was fibrous with an average diameter of about 0.2 micron and a length of about 8 microns, and had a length-to-diameter ratio of about 40. By powder X-ray diffraction, this fibrous product was found to be magnesium oxide. Chemical analysis showed that it contained 0.1% of $SO_4$.

EXAMPLE 2

To 5 liters of an aqueous solution of magnesium chloride (4 moles/liter) was added 85 g (corresponding to 2 moles) of a powder of magnesium oxide (purity 95%). The mixture was fully stirred at room temperature (about 20° C.), and then heated to about 70° C. to dissolve the added magnesium oxide almost completely. Then, the heating was stopped, and the solution was left to stand at room temperature for 2 days. There was obtained basic magnesium chloride in the form of needle-like crystals, $Mg(OH)_{1.5}Cl_{0.5} \cdot 2H_2O$, having an average diameter of about 0.4 micron and a length of about 120 microns. The crystals were separated by filtration, dried and the calcined at 900° C. for 1 hour. When observed under a scanning electron microscope at a magnification of 10,000, the calcination product was found to be fibrous crystals having an average diameter of about 0.3 micron and a length of about 120 microns. Its length-to-diameter ratio was about 400. Powder X-ray diffraction showed the fibrous product to be magnesium oxide. It contained 0.8% of Cl as an impurity.

EXAMPLE 3

To 1.5 liters of an aqueous solution containing 32 g of anhydrous sodium carbonate was added 320 g of basic magnesium chloride in the form of needle-like crystals, $Mg(OH)_{5/3}Cl_{\frac{1}{3}}.4/3H_2O$. The mixture was heated to about 70° C., and maintained at this temperature for about 20 minutes. The reaction mixture was then dehydrated, washed with water and dried to give needle-like crystals having an average diameter of about 0.1 micron and a length of about 40 microns. Chemical analysis showed that the resulting crystals were basic magnesium carbonate chloride of the composition $Mg(OH)_{1.67}Cl_{0.23}(CO_3)_{0.05}.1.9H_2O$.

The product was calcined at about 1200° C. for 2 hours to give a fibrous product having an average diameter of about 0.1 micron and a length of about 38 microns. Its length-to-diameter ratio was about 380. Powder X-ray diffraction showed this product to be magnesium oxide. It contained 0.01% of Cl as an impurity and a trace of $CO_3$.

USE EXAMPLE 1

Increase of mechanical strength in a brick:

Five parts of an aqueous solution of magnesium chloride (2 moles/liter) was added as a binder to 100 parts of commercial magnesia clinker powder, and the mixture was molded under a pressure of 800 kg/cm², dried, and calcined at 1700° C. to form a brick.

Separately, 5 parts by weight of an aqueous solution of magnesium chloride (2 moles/liter) was added as a binder to 100 parts by weight of fibrous magnesium oxide having an average diameter of about 0.4 micron and a length of about 7 microns measured under an electron microscope at a magnification of 10,000 (the length-to-diameter ratio about 18) and a BET surface area of 2 m²/g. The mixture was molded under a pressure of 800 kg/cm², dried and calcined at 1700° C. to form a brick.

The two bricks were each tested for flexural strength at 1400° C. The results are shown in Table 1.

TABLE 1

| Magnesium oxide used | Flexural strength (kg/cm²) |
| --- | --- |
| Commercial magnesia clinker (cubic form) | 45 |
| Fibrous magnesium oxide of the invention | 274 |

USE EXAMPLE 2

Improvement in the thermal conductivity of an epoxy resin:

Commercial high-temperature (about 1200° C.) calcined magnesium oxide or the fibrous magnesium oxide of the invention was added in an amount of 40, 100 or 150 parts by weight to 100 parts of an epoxy resin, and 10 parts of diethylene triamine was added as a curing agent. The mixture was left to stand at 25° C. for 24 hours to cure the epoxy resin and molded into a plate form. The thermal conductivity of the plate is shown in Table 2.

The fibrous magnesium oxide of this invention had an average diameter of about 0.5 micron and a length of 40 microns measured under an electron microscope at a magnification of 10,000 (length-to-diameter ratio about 40) and a BET surface area of 3 m²/g.

TABLE 2

| | Thermal conductivity (kcal/m.hr. °C.) (Parts by weight of MgO added) | | | |
| --- | --- | --- | --- | --- |
| Magnesium oxide | 0 | 40 | 100 | 150 |
| Commercial cubic magnesium oxide | 0.18 | 0.28 | 0.40 | 0.62 |
| Fibrous magnesium oxide of the invention | 0.18 | 0.35 | 0.68 | 0.96 |

USE EXAMPLE 3

Reinforcing agent for a resin:

A powder of fibrous magnesium oxide having an average diameter of 0.3 microns and a length of 7 microns (the length-to-diameter ratio about 23) and a BET surface area of 6 m²/g was surface-treated with 2% by weight, based on he weight of the fibrous magnesium oxide, of glycerin monostearate, and then added in an amount of 30% by weight to polypropylene. The mixture was melt-kneaded at about 230° C. in an extruder, and then injection-molded at the same temperature.

Similarly, a powder of commercial cubic magnesium oxide having a diameter of about 0.1 micron and a BET surface area of 20 m²/g was surface-treated with 2% by weight of glycerin monostearate, and mixed with polypropylene and molded in the same way as above.

The properties of polypropylene and the resulting molded articles are shown in Table 3.

TABLE 3

| | Kind of magnesium oxide | | |
| --- | --- | --- | --- |
| | Polypropylene | Fibrous magnesium oxide | Commercial cubic magnesium oxide |
| Tensile strength (kg/cm²) | 363 | 328 | 240 |
| Elongation (%) | — | 170 | 38 |
| Flexural strength (kg/cm²) | 455 | 620 | 380 |
| Flexural modulus | 152 | 497 | 185 |
| Izod impact strength (kg-cm/cm) | 1.9 | 4.8 | 3.2 |
| Melt flow index (g/10 min.) | 4.5 | 6.1 | 3.8 |

USE EXAMPLE 4

Heat resistant warmth-keeping material:

A powder of fibrous basic magnesium sulfate having an average particle diameter of about 0.2 micron and a length of about 140 microns (length-to-diameter ratio about 700) and a BET surface area of 18 m²/g was molded under a pressure of a about 1 ton/cm², and then calcined at 1100° C. for 2 hours to give a molded article of the fibrous magnesium oxide of the invention having a diameter of 0.2 micron and a length of 120 microns (the length-to-diameter ratio about 600) and a BET surface area of 1 m²/g. The bulk density and thermal conductivity of the molded article are shown in Table 4 together with the data of commercial magnesiun oxide and calcium silicate fibers.

TABLE 4

| Magnesium oxide | Bulk density (g/cm²) | Thermal conductivity at 700° C. (kcal/m.hr., °C.) |
|---|---|---|
| Fibrous magnesium oxide | 0.086 | 0.062 |
| Commercial cubic magnesium oxide | 3.1 | 27.4 |
| Calcium silicate fibers | 0.38 | 0.118 |

What we claim is:

1. A magnesium oxide having a cubic system needle-like crystal structure and a length-to-diameter ratio, determined by an electron microscope at a magnification of 10,000, of at least about 5.

2. The magnesium oxide of claim 1 which has an average diameter of about 0.01 to about 10 microns and a length of about 0.1 to about 10,000 microns.

3. A process for producing a magnesium oxide having a cubic system needle-like crystal structure and a length-to-diameter ratio, determined by an electron microscope at a magnification of 10,000, of at least about 5, which comprises calcining a basic magnesium compound having a needle-like crystal structure expressed by the following formula $$Mg(OH)_{2-nx}A_x^{n-}\cdot mH_2O$$

wherein $A^{n-}$ represents a monovalent (n=1) to tetravalent (n=4) anion, x is $0.2 \leq x \leq 0.5$, and m is $0 < m \leq 2$, or a magnesium hydroxide having a needle-like crystal structure, at a temperature of not less than about 400° C. to convert it to the magnesium oxide.

4. The process of claim 3 wherein the calcination temperature is not less than about 900° C.

* * * * *